(12) United States Patent
Liu et al.

(10) Patent No.: US 10,059,172 B2
(45) Date of Patent: Aug. 28, 2018

(54) AIR CONDITIONING SYSTEM, METHOD FOR CONTROLLING THE SAME AND HYBRID VEHICLE

(71) Applicant: BYD COMPANY LIMITED, Shenzhen (CN)

(72) Inventors: Changjiu Liu, Shenzhen (CN); Guorui Liu, Shenzhen (CN); Zhichun Li, Shenzhen (CN); Jiewen Li, Shenzhen (CN); Yanzhang Wei, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 15 days.

(21) Appl. No.: 15/102,446

(22) PCT Filed: Dec. 16, 2014

(86) PCT No.: PCT/CN2014/093997
§ 371 (c)(1),
(2) Date: Jun. 7, 2016

(87) PCT Pub. No.: WO2015/090191
PCT Pub. Date: Jun. 25, 2015

(65) Prior Publication Data
US 2017/0001494 A1     Jan. 5, 2017

(30) Foreign Application Priority Data

Dec. 16, 2013    (CN) .......................... 2013 1 0694954

(51) Int. Cl.
*B60H 1/32*     (2006.01)
*F25B 27/00*     (2006.01)
(Continued)

(52) U.S. Cl.
CPC ........... *B60H 1/3208* (2013.01); *B60H 1/004* (2013.01); *B60H 1/00385* (2013.01);
(Continued)

(58) Field of Classification Search
CPC ..... B60H 1/004; B60H 1/3208; B60H 1/3222
(Continued)

(56) References Cited

U.S. PATENT DOCUMENTS 5,934,089 A * 8/1999 Nakagawa ............. B60H 1/004
                                                       62/133
6,464,027 B1 * 10/2002 Dage ...................... B60H 1/004
                                                    123/41.14
(Continued)

FOREIGN PATENT DOCUMENTS

CN        2693506 Y      4/2005
CN      101177140 A      5/2008
(Continued)

OTHER PUBLICATIONS

WO2012008461A1—English Machine Translation Retrieved Aug. 2017.*
(Continued)

*Primary Examiner* — Len Tran
*Assistant Examiner* — Jenna M Hopkins
(74) *Attorney, Agent, or Firm* — Anova Law Group, PLLC (57) ABSTRACT

A hybrid vehicle, an air conditioning system and a method for controlling the air conditioning system are provided. The air conditioning system includes: an electric compressor; a mechanical compressor, connected with the electric compressor in parallel; a power battery, connected with the electric compressor and configured to supply power to the electric compressor; an engine, connected with the mechanical compressor and configured to supply a power source to the mechanical compressor; an engine controller, connected with the engine and configured to start the engine when the mechanical compressor is to be started; a battery manager, connected with the power battery and configured to detect a (Continued)

state of charge of the power battery; and a controller, connected with the engine controller and the battery manager and configured to start the electric compressor and the mechanical compressor at different time according to the state of charge of the power battery.

20 Claims, 3 Drawing Sheets

(51) Int. Cl.
F25B 49/02 (2006.01)
B60H 1/00 (2006.01)
B60W 10/30 (2006.01)
B60W 20/00 (2016.01)

(52) U.S. Cl.
CPC ......... B60H 1/3222 (2013.01); B60H 1/3223 (2013.01); B60W 10/30 (2013.01); B60W 20/00 (2013.01); F25B 27/00 (2013.01); F25B 49/022 (2013.01); B60H 2001/327 (2013.01); B60H 2001/3248 (2013.01); B60H 2001/3261 (2013.01); B60H 2001/3266 (2013.01); B60H 2001/3282 (2013.01); B60H 2001/3294 (2013.01); F25B 2327/001 (2013.01); F25B 2400/06 (2013.01); F25B 2600/0251 (2013.01); Y10S 903/93 (2013.01)

(58) Field of Classification Search
USPC ....................................................... 165/202
See application file for complete search history.

(56) References Cited

U.S. PATENT DOCUMENTS

| | | | |
|---|---|---|---|
| 6,524,217 B1 | 2/2003 | Murakami et al. | |
| 6,651,450 B1* | 11/2003 | Tamegai | B60H 1/3222 62/133 |
| 7,032,393 B2* | 4/2006 | Tamai | B60H 1/004 62/115 |
| 7,583,053 B2* | 9/2009 | Kamohara | B60K 6/48 320/106 |
| 9,409,564 B2* | 8/2016 | Shigyo | B60W 20/10 |
| 9,637,109 B1* | 5/2017 | Johri | B60W 10/06 |
| 2001/0010261 A1* | 8/2001 | Oomura | B60H 1/3208 165/42 |
| 2002/0019691 A1 | 2/2002 | Matsubara et al. | |
| 2002/0157414 A1* | 10/2002 | Iwanami | B60H 1/3222 62/236 |
| 2002/0194858 A1* | 12/2002 | Mohrmann | B60H 1/3222 62/236 |
| 2003/0010487 A1* | 1/2003 | Ieda | B60H 1/00428 165/202 |
| 2003/0068232 A1 | 4/2003 | Iwanami et al. | |
| 2003/0233840 A1* | 12/2003 | Choi | B60H 1/3222 62/236 |
| 2004/0000156 A1* | 1/2004 | Inoue | B60H 1/3208 62/236 |
| 2004/0168454 A1* | 9/2004 | Iritani | B60H 1/004 62/230 |
| 2005/0044873 A1* | 3/2005 | Tamai | B60H 1/004 62/323.1 |
| 2005/0257545 A1* | 11/2005 | Ziehr | B60H 1/004 62/236 |
| 2006/0042284 A1 | 3/2006 | Heberle et al. | |
| 2007/0022835 A1 | 2/2007 | Kilian et al. | |
| 2007/0193792 A1* | 8/2007 | Yamaguchi | B60H 1/004 180/65.225 |
| 2009/0166109 A1 | 7/2009 | Duan | |
| 2010/0244560 A1* | 9/2010 | Sato | B60R 16/03 307/10.1 |
| 2011/0118078 A1 | 5/2011 | Kraska et al. | |
| 2012/0152511 A1* | 6/2012 | Chang | B60H 1/00428 165/202 |
| 2012/0265427 A1 | 10/2012 | Petridis et al. | |
| 2012/0316713 A1* | 12/2012 | Pfefferl | F04C 28/06 701/22 |
| 2013/0160986 A1* | 6/2013 | Hashigaya | B60H 1/3208 165/202 |
| 2013/0211649 A1* | 8/2013 | Tashiro | B60H 1/00735 701/22 |
| 2014/0174087 A1* | 6/2014 | Mizoguchi | F01K 23/065 60/670 |
| 2015/0217623 A1* | 8/2015 | Hatakeyama | B60L 1/003 165/42 |
| 2015/0273976 A1* | 10/2015 | Enomoto | B60K 6/22 165/202 |

FOREIGN PATENT DOCUMENTS

| | | | | |
|---|---|---|---|---|
| CN | 101659186 A | | 3/2010 | |
| CN | 102328566 A | | 1/2012 | |
| CN | 202328527 U | | 7/2012 | |
| CN | 103386872 A | * | 11/2013 | |
| CN | 104121664 A | * | 10/2014 | |
| DE | 102009032871 A1 | * | 2/2010 | ............ B60H 1/004 |
| DE | 102008051709 A1 | | 4/2010 | |
| DE | 102011000796 A1 | * | 8/2012 | ............ B60H 1/004 |
| EP | 1285791 A1 | * | 2/2003 | ........... B60H 1/3208 |
| JP | 2002247774 A | * | 8/2002 | ............ B60H 1/004 |
| JP | 2004237907 A | | 8/2004 | |
| JP | 2005045883 A | | 2/2005 | |
| JP | 2007126082 A | | 5/2007 | |
| JP | WO 2012008461 A1 | * | 1/2012 | .............. B60K 6/36 |
| JP | WO 2012042751 A1 | * | 4/2012 | ............ B60H 1/004 |
| JP | 2012228960 A | | 11/2012 | |
| JP | 2012245961 A | | 12/2012 | |
| KR | 20130075067 A | * | 7/2013 | |

OTHER PUBLICATIONS

KR20130075067A—English Machine Translation Retrieved Aug. 2017.*
DE102011000796A1—English Machine Translation Retrieved Aug. 2017.*
DE 102009032871 A1—English Machine Translation—Retrieved Aug. 2017.*
CN104121664A—English Machine Translation Retrieved Aug. 2017.*
CN103386872—English Machine Translation Retrieved Aug. 2017.*
The World Intellectual Property Organization (WIPO) International Search Report for PCT/CN2014/093997 dated Mar. 11, 2015.

* cited by examiner

AIR CONDITIONING SYSTEM, METHOD FOR CONTROLLING THE SAME AND HYBRID VEHICLE

CROSS REFERENCE TO RELATED APPLICATION

This application is a national stage application of PCT application PCT/CN2014/093997, filed on Dec. 16, 2014, which claims priority to and benefits of Chinese Patent Application Serial No. 201310694954.2, filed with the State Intellectual Property Office of P. R. China on Dec. 16, 2013. The entire content of all of the above-identified applications is incorporated herein by reference.

FIELD

The present disclosure relates to a hybrid vehicle field and, more particularly, to an air conditioning system of a hybrid vehicle, a method for controlling an air conditioning system and a hybrid vehicle.

BACKGROUND

An electrical air conditioning system for a vehicle is provided in a related art. The system is a battery-powered single electric compressor air conditioning system. In the system, a mechanical compressor is replaced by an electric compressor, and a power battery is provided to supply power to the electric compressor, so that the refrigerant flowing from an evaporation chamber is compressed to be the working fluid having a high temperature and a high pressure, and then the working fluid is fed to a condenser to cool, and the later working theory is the same with that of the conventional air conditioning system.

However, when the vehicle is parking for a long time or in a traffic jam condition, this kind of air conditioning system may cause an insufficient voltage problem of the battery, which may cause the vehicle cannot start properly.

SUMMARY

Embodiments of the present disclosure seek to solve at least one of the problems existing in the related art to at least some extent.

Embodiments of the present disclosure provide an air conditioning system of a hybrid vehicle. The air conditioning system includes: an electric compressor; a mechanical compressor, connected with the electric compressor in parallel; a power battery, connected with the electric compressor and configured to supply power to the electric compressor; an engine, connected with the mechanical compressor and configured to supply a power source to the mechanical compressor; an engine controller, connected with the engine and configured to start the engine when the mechanical compressor is to be started; a battery manager, connected with the power battery and configured to detect a state of charge of the power battery; and a controller, connected with the engine controller and the battery manager and configured to start the electric compressor and the mechanical compressor at different time according to the state of charge of the power battery.

Embodiments of the present disclosure further provide a vehicle. The vehicle includes the air conditioning system as previously described.

With the air conditioning system of the hybrid vehicle and the vehicle according to embodiments of the present disclosure, an electric compressor and a mechanical compressor connected in parallel are adopted, and the electric compressor and the mechanical compressor are controlled to start at different time according to the state of charge of the power battery, which can solve the problem of insufficient voltage. The air conditioning system can provide the refrigerant with a high pressure and a high temperature by the electric compressor and the mechanical compressor independent from each other, which provides the passengers a comfortable and energy-saving ride environment, thus fully meeting the needs of users.

Embodiments of the present disclosure further provide a method for controlling an air conditioning system of a hybrid vehicle. The air conditioning system includes: an electric compressor, a mechanical compressor connected with the electric compressor in parallel, a power battery and an engine. The method includes the steps of: detecting a state of charge of the power battery; and starting the electric compressor and the mechanical compressor at different time according to the state of charge of the power battery.

With the method for controlling an air conditioning system according to embodiments of the present disclosure, the electric compressor and the mechanical compressor are controlled to start at different time according to the state of charge of the power battery, which can solve the problem of insufficient voltage. Moreover, the air conditioning system can provide the refrigerant with a high pressure and a high temperature by the electric compressor and the mechanical compressor independent from each other, which provides the passengers a comfortable and energy-saving ride environment, thus fully meeting the needs of users.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will now be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be described.

However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure. However it should be understood that the embodiment of the present disclosure is not limited thereby. Instead, the embodiments of the present disclosure include all the variants, modifications and their equivalents within the spirit and scope of the present disclosure as defined by the claims.

Figure 1:
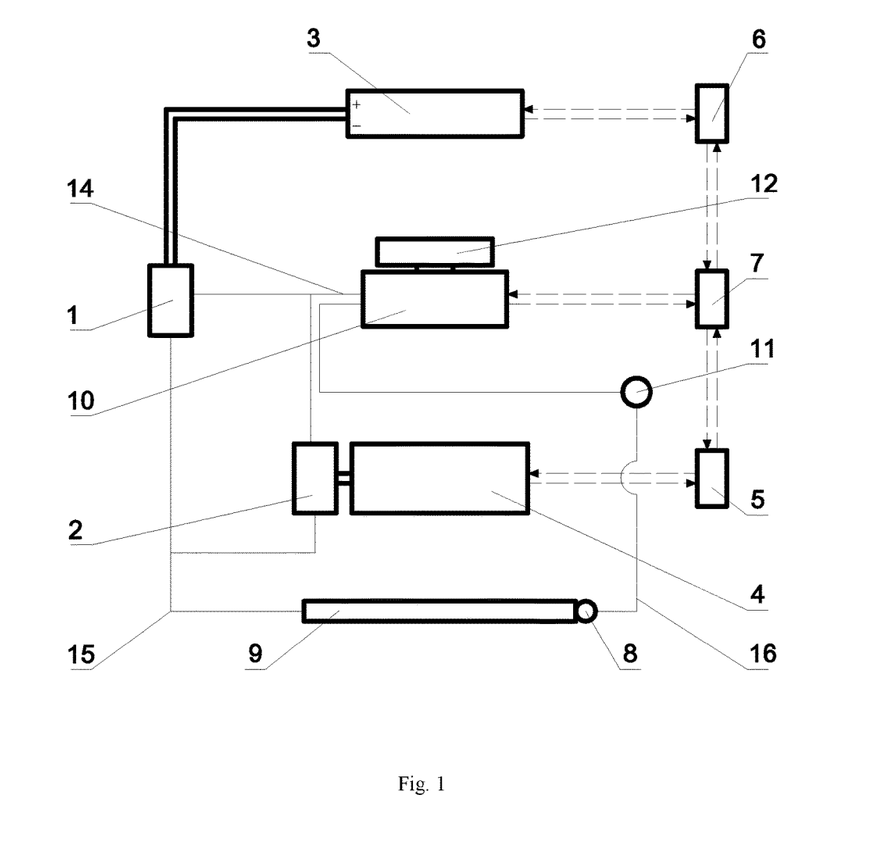
FIG. 1 is a schematic view of an air conditioning system of a hybrid vehicle according to an embodiment of the present disclosure.

FIG. 1 is a schematic view of an air conditioning system of a hybrid vehicle according to an embodiment of the present disclosure. As shown in FIG. 1, the air conditioning system for the hybrid vehicle includes: an electric compressor 1, a mechanical compressor 2, a power battery 3, an engine 4, an engine controller 5, a battery manager 6 and a controller 7.

The mechanical compressor 2 is connected with the electric compressor 1 in parallel. The power battery 3 is connected with the electric compressor 1 and is configured to supply power to the electric compressor 1. The engine 4 is connected with the mechanical compressor 2. The engine 4 is configured to supply a power source to the mechanical compressor 2. The engine controller 5 is connected with the engine 4 and is configured to start the engine 4 when the mechanical compressor 2 is to be started. That is, the electric compressor 1 is powered by the power battery 3 and the mechanical compressor 2 is powered by the engine 4.

As shown in FIG. 1, the battery manager 6 is connected with the power battery 3 and is configured to detect a state of charge (SOC) of the power battery. The controller 7 is connected with the engine controller 5 and the battery manager 6 and is configured to start the electric compressor 1 and the mechanical compressor 2 at different time according to the SOC of the power battery 3. That is, the controller 7 may communicate mutually with the battery manager 6 and the engine controller 5, and may control the electric compressor 1 and the mechanical compressor 2 according to the SOC of the power battery 3 and an operation state of the engine 4. In some embodiments, the controller 7 is configured as an air conditioning controller.

Figure 2:
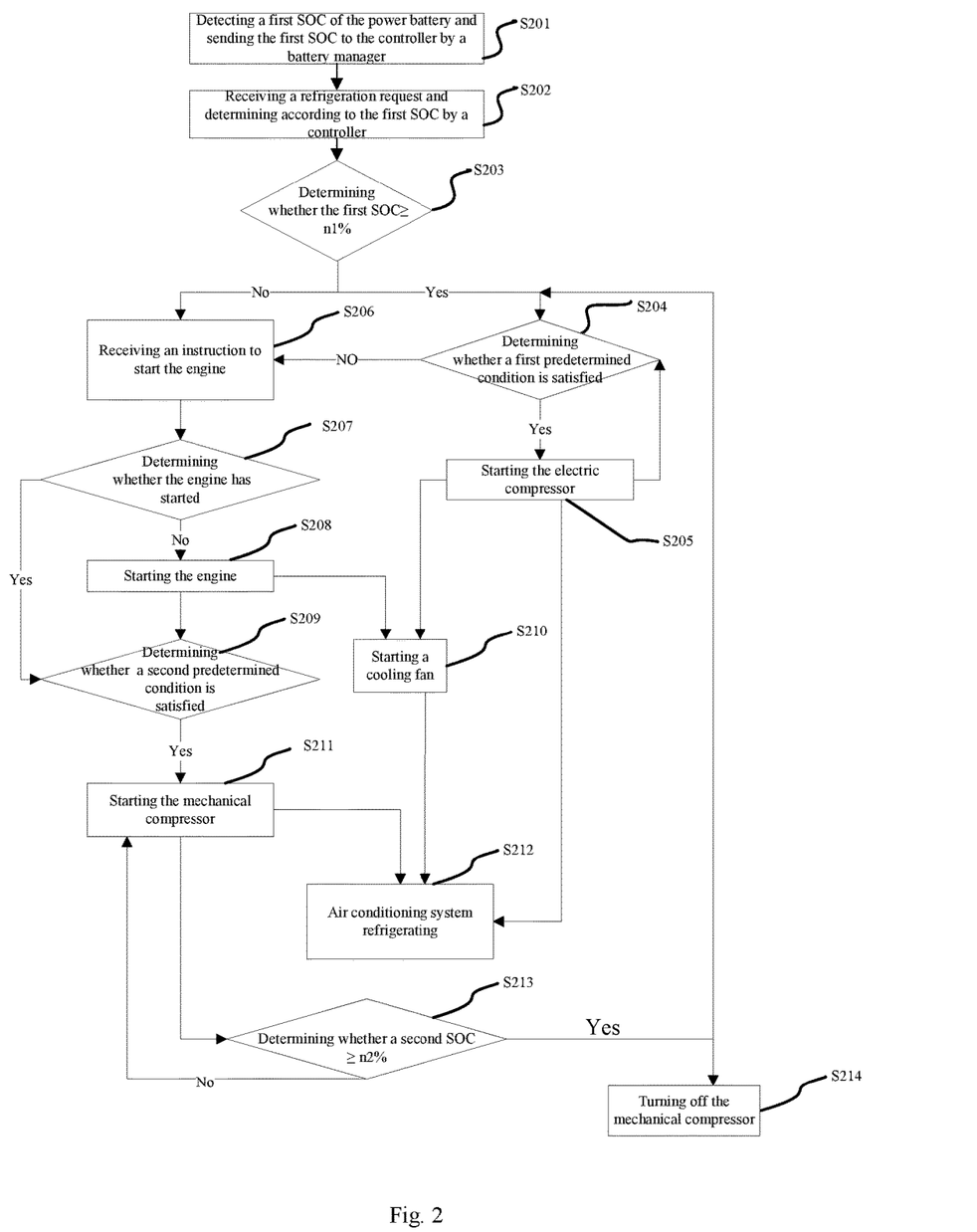
FIG. 2 is a flow chart illustrating a method for controlling an air conditioning system of a hybrid vehicle according to an embodiment of the present disclosure.

In an embodiment of the present disclosure, as shown in FIG. 2, the battery manager 6 is configured to detect a first state of charge of the power battery 3. When the first state of charge is larger than or equal to a first threshold n1%, the controller 7 is configured to determine whether a first predetermined condition for starting the electric compressor 1 is satisfied and to start the electric compressor 1 when the first predetermined condition is satisfied.

That is, when receiving a refrigeration instruction, the controller 7 is configured to determine whether the first charge state is larger than or equal to a first threshold n1%. When the first charge state is larger than or equal to the first threshold n1%, the controller 7 is configured to determine whether the first predetermined condition for starting the electric compressor 1 is satisfied. n1% is a preset SOC value of the power battery 3, which may ensure an output power of the electric compressor 1.

In some embodiments, the first predetermined condition includes: (1) an air blower of the air conditioning system is turned on and works in a normal operation state; (2) a line pressure value of the air conditioning system is in a normal range; (3) the power battery is allowed to supply power to the electric compressor; (4) a temperature of an evaporator of the air conditioning system is larger than or equal to a first temperature threshold t1° C.; (5) the mechanical compressor is turned off, etc. The t1° C. is a preset minimum temperature that an evaporation chamber shall reach when the air conditioning system is refrigerating.

As shown in FIG. 2, when the first state of charge is less than the first threshold or the first predetermined condition is dissatisfied, the controller 7 is further configured to control the engine controller 5 to start the engine 4. That is, the controller 7 communicates with the engine controller 5 to start the engine 4. The controller 7 is further configured to determine whether a second predetermined condition for starting the mechanical compressor 2 is satisfied, and the controller 7 controls the mechanical compressor 2 to start when the second predetermined condition is satisfied. The first predetermined condition is dissatisfied means that the condition that the power battery 3 allows to discharge to the electric compressor 1 is dissatisfied. If one of these conditions: the an air blower of the air conditioning system is turned on and works in a normal operation state; a line pressure value of the air conditioning system is in a normal range; a temperature of an evaporator of the air conditioning system is larger than or equal to a first temperature threshold; and the mechanical compressor is turned off is not satisfied, the air conditioning system generates a failure alarm.

In some embodiments, the second predetermined condition includes: (1) an air blower of the air conditioning system is turned on and works in a normal operation state; (2) a line pressure value of the air conditioning system is in a normal range; (3) a temperature of an evaporator of the air conditioning system is larger than or equal to a first temperature threshold; and (4) the electric compressor is turned off.

In the embodiment of the present disclosure, as shown in FIG. 2, the controller 7 is further configured to control a cooling fan of the air conditioning system to start, when the electric compressor 1 or the engine 4 is started.

As shown in FIG. 2, after the mechanical compressor 2 is started, the battery manager 6 is configured to detect a second state of charge of the power battery 3; when the second state of charge is larger than or equal to a second threshold n2%, the controller 7 is configured to determine whether a third predetermined condition for starting the electric compressor 1 is satisfied; and when the third predetermined condition is satisfied, the controller 7 is further configured to start the electric compressor 1, in which the second threshold is larger than the first threshold.

In other words, when the vehicle is running, the power battery 3 generally is charged and the battery manager 6 detects the second state of charge of the power battery 3. When the second state of charge of the power battery 3 is larger than or equal to the second threshold n2% (which is the SOC value of the power battery 3 that ensures the output power of the electric compressor 1, after the power battery 3 is charged by the hybrid vehicle), the controller 7 controls the mechanical compressor 2 to stop working and controls the electric compressor 1 to work by determining whether the third predetermined condition is satisfied. In order to avoid a condition that the electric compressor 1 and the mechanical compressor 2 are turned on and off back and forth during the running of the hybrid vehicle, the first threshold n1% is less than the second threshold n2%, and every time when the air conditioning system starts to work, the first state of charge of the power battery 3 is compared with the first threshold n1% first. After the electric compressor 1 is turned off at a first time, the second state of charge of the power battery 3 is compared with the second threshold n2% to determine whether to start the electric compressor 1. Moreover, every time when it is determined whether to turn off the electric compressor 1, the state of charge of the power battery 3 is compared with the first threshold n1%, i.e., once the state of charge of the power battery 3 is less than the first threshold n1%, the electric compressor 1 is turned off. In this way, by setting a SOC range from n1% to n2% of the power battery 3, the condition that the electric compressor 1 and the mechanical compressor 2 are turned on and off back and forth in the running of the hybrid vehicle is avoided, thus improving working lives of the electric compressor 1 and the mechanical compressor 2. In some embodiments, the third predetermined condition is the same with the first predetermined condition and includes: (1) an air blower of the air conditioning system is turned on and works in a normal operation state; (2) a line pressure value of the air conditioning system is in a normal range; (3) the power battery is allowed to supply power to the electric compressor; (4) a temperature of an evaporator of the air conditioning system is larger than or equal to a first temperature threshold; and (5) the mechanical compressor is turned off.

In the embodiment of the present disclosure, as shown in FIG. 2, after the electric compressor 1 is started, the battery manager 6 is configured to detect a third state of charge of the power battery 3. When the third state of charge is less than the first threshold, the controller 7 is configured to turn off the electric compressor 1. And then the controller 7 is further configured to control the engine controller 5 to start the engine 4, to determine whether a fourth predetermined condition for starting the mechanical compressor 2 is satisfied, and to start the mechanical compressor 2 when the fourth predetermined condition is satisfied.

In some embodiments, the fourth predetermined condition is the same as the second predetermined condition and includes: (1) an air blower of the air conditioning system is turned on and works in a normal operation state; (2) a line pressure value of the air conditioning system is in a normal range; (3) a temperature of an evaporator of the air conditioning system is larger than or equal to a first temperature threshold; and (4) the electric compressor is turned off.

In another embodiment of the present disclosure, when the hybrid vehicle runs, the battery manager 6 is configured to detect a fourth SOC of the power battery 3. When the fourth SOC is larger than or equal to a third threshold n3%, the hybrid vehicle enters an electrical mode, and the controller 7 is configured to start the electric compressor 1, wherein the third threshold is larger than the first threshold.

In some embodiments, when the fourth SOC is less than the third threshold n3% and larger than or equal to the first threshold n1%, the hybrid vehicle enters a hybrid mode, and the engine 4 is started, and the controller 7 is configured to control the electric compressor 1 to start.

In some embodiments, when the fourth SOC is less than the first threshold n1%, the hybrid vehicle is in the hybrid electrical mode, and the engine 4 is started, and the controller 7 is configured to turn off the electric compressor 1 and to start the mechanical compressor 2.

In some embodiments, since an operating power of the electric compressor 1 is generally less than a required power for a normal run of the hybrid vehicle provided by a driving motor, in order to ensure the operation of the hybrid vehicle, a setting value of the second threshold n2% shall not affect a running strategy of a mode switching between the hybrid mode and the electrical mode of the hybrid vehicle. For example, if a condition of the mode switching between the electrical mode and the hybrid mode is determined by the SOC of the power battery 3, and a SOC threshold thereof is set as the third threshold n3%, it is required that n2%<n3%.

In some embodiments, when the fourth state of charge is larger than or equal to the third threshold n3%, the hybrid vehicle enters the electrical mode, and the controller 7 is configured to start the electric compressor 1, i.e., the air condition system operates based on the electric compressor 1 and the mechanical compressor 2 is turned off, in which the third threshold n3% is larger than the first threshold n1%. In some embodiments, when the fourth state of charge is less than the third threshold n3% and larger than or equal to the first threshold n1%, the hybrid vehicle enters the hybrid mode, and the engine 4 is started, and the controller 7 is configured to control the electric compressor 1 to start, i.e., the air condition system still operates based on the electric compressor 1 and the mechanical compressor 2 is turned off.

In some embodiments, when the fourth state of charge is less than the first threshold n1%, the hybrid vehicle is in the hybrid electrical mode, and the engine 4 is started, and the controller 7 is configured to turn off the electric compressor 1 and to start the mechanical compressor 2.

In some embodiments, after the mechanical compressor 2 is started and when the fourth state of charge is less than the third threshold n3% and larger than or equal to the second threshold n2%, the hybrid vehicle is in the hybrid electrical mode, and the engine 4 is started, and the controller 7 is configured to start the electric compressor 1 and to turn off the mechanical compressor 2. That is, when the SOC of the power battery 3 reaches n2% as charged by the running of the hybrid vehicle, the hybrid vehicle is still in the hybrid mode and the engine 4 has been started, the controller 7 turns off the mechanical compressor 2 and starts the electric compressor 1 until the SOC of the power battery 3 drops below n1%, and then the controller 7 stops the electric compressor 1 and starts the mechanical compressor 2.

In an embodiment of the present disclosure, when the fourth state of charge is less than the first threshold and the hybrid electric vehicle enters a compulsory electrical mode, the controller 7 is configured to control the engine controller 5 to start the engine 4, and to start the mechanical compressor 2. The engine 4 is controlled by a gearbox controller of the hybrid to be independent from driving the hybrid vehicle. If the hybrid vehicle has the compulsory electrical mode (i.e., when the SOC of the power battery 3 is less than the third threshold n3%, the hybrid vehicle is still running in the electrical mode), when the SOC of the power battery 3 is less than the first threshold n1%, in order not to affect a running and power supply mode of the hybrid vehicle with an automatic transmission, when the engine 4 is started, the gearbox controller controls a clutch to disengage from a flywheel of the engine 4, so that the engine 4 does not participate in driving the hybrid vehicle but supplies power to the mechanical compressor 2 in a low speed. Thus, the operation state of the air conditioning system is independent from the running mode of the hybrid vehicle, which avoids a conflict of control strategies.

Thus, in embodiments of the present disclosure, the controller 7 controls the electric compressor 2 to work in accordance with the SOC of the power battery 3 fed back by the battery manager 6 in priority. That is, when an electric quantity of the power battery is sufficient, no matter what the running mode of the hybrid vehicle is, the electric compressor 1 operates first, and in an entire refrigeration procedure of the air conditioning system, the mechanical compressor 2 and the electric compressor 1 work independently.

In an embodiment of the present disclosure, as shown in FIG. 1, the air conditioning system of a hybrid vehicle further includes a liquid-drier 8, a condenser 9, an evaporator 10, an expansion valve 11, and an air blower 12. A first pipe 14 is connected between the evaporator 10 and the mechanical compressor 2. A second pipe is connected between the evaporator 10 and the electric compressor 1. A third pipe is connected with the electric compressor 1 and a fourth pipe of the mechanical compressor 2 is merged to a main pipe 15 to supply the gas refrigerant with a high temperature and a high pressure to the condenser 9.

When the controller 7 receives the refrigeration instruction, the controller 7 communicates with the battery manager 6 to determine whether the first state of charge of the power battery 3 is larger or equal to the first threshold and the first predetermined condition for starting the electric compressor 1 is satisfied. When the battery manager 6 confirmed that the first state of charge of the power battery 3 is larger or equal to the first threshold and the first predetermined condition for starting the electric compressor 1 is satisfied, the controller 7 sends a start instruction to the electric compressor to start the electric compressor 1. If any one of the above two conditions is dissatisfied, the controller 7 does not send the start instruction to the electric compressor 1. When the electric compressor 1 is started normally, a gaseous refrigerant with a low temperature and a low pressure discharged from the evaporator 10 via the first pipe 14 is compressed into a gaseous refrigerant with a high temperature and a high pressure, and the gaseous refrigerant with a high temperature and a high pressure is transmitted to the condenser 9 through the main pipe 15. In the condenser 9, the gaseous refrigerant with a high temperature and a high pressure becomes into a liquid refrigerant with a medium temperature and a medium pressure which flows through the fifth pipe 16 into the expansion valve 11 after passing by the liquid-drier 8. After passing through the expansion valve 11, the refrigerant with a medium temperature and a medium pressure becomes into a steam with a low temperature and a low pressure which enters the evaporator 10 and becomes a gas with a low pressure and a low temperature by a heat exchange of air in an evaporator chamber and a cabin, and an air blower 12 blows the gas with a low pressure and a low temperature into a passenger compartment, and the gas with a low pressure and a low temperature (i.e., the gaseous refrigerant with a low temperature and a low pressure) flows into the electric compressor 1 through the first pipe 14.

When the electric compressor 1 cannot start normally, the controller 7 communicates with the engine controller 5 to start the engine 4. When a condition for starting the engine 4 is satisfied and the second predetermined condition for starting the mechanical compressor 2 is also satisfied, the engine 4 drives the mechanical compressor 2 to work. The function of the mechanical compressor 2 is similar with that of the electric compressor 1 in the air conditioning system, and thus a working principle of the mechanical compressor 2 is the same as the electric compressor 1, and is omitted herein.

In some embodiments, when the electric quantity of the power battery 3 is insufficient, and the electric compressor 1 has been started and is operating, the electric compressor 1 stops working automatically. At the same time, the controller 7 communicates with the engine controller 5 to start the mechanical compressor 2 after detecting that the condition for starting the electric compressor 1 is not satisfied.

With the air conditioning system for the hybrid vehicle and the vehicle according to embodiments of the present disclosure, the electric compressor and the mechanical compressor connected in parallel are adopted, and the electric compressor and the mechanical compressor are controlled to start at different time according to the state of charge of the power battery, which can solve the problem of insufficient voltage. The air conditioning system can provide the refrigerant with a high pressure and a high temperature by the electric compressor and the mechanical compressor independent from each other, which provides the passengers a comfortable and energy-saving ride environment, thus fully meeting the needs of users.

In addition, embodiments of the present invention also provided a hybrid vehicle including the air conditioning system as described above. The air conditioning system including an electric compressor and a mechanical compressor connected in parallel, and the electric compressor and the mechanical compressor are controlled to start at different time according to the state of charge of the power battery, which can solve the problem of insufficient voltage. The air conditioning system can provide the refrigerant with a high pressure and a high temperature by the electric compressor and the mechanical compressor independent from each other, which provides the passengers a comfortable and energy-saving ride environment, thus fully meeting the needs of users.

Figure 3:
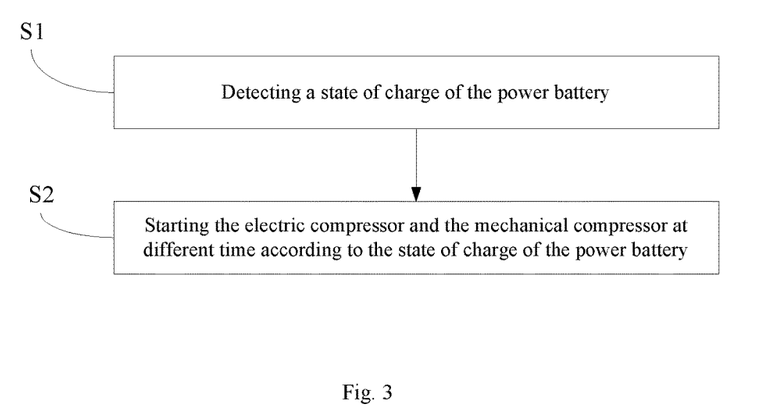
FIG. 3 is a flow chart illustrating a method for controlling an air conditioning system of a hybrid vehicle according to an embodiment of the present disclosure.

FIG. 3 is a flow chart of a method for controlling an air conditioning system of a hybrid vehicle according to an embodiment of the present disclosure.

The air conditioning system includes: an electric compressor, a mechanical compressor connected with the electric compressor in parallel, a power battery and an engine. The method includes following steps.

In step S1, a state of charge of the power battery is detected.

In step S2, the electric compressor and the mechanical compressor are started at different time according to the state of charge of the power battery.

In an embodiment of the present disclosure, as shown in FIG. 2, the method for controlling an air conditioning system includes following steps.

In step S201, a first state of charge (SOC) of the power battery is detected in real time and is sent to a controller of the air conditioning system.

In step S202, when receiving a refrigeration instruction, the controller determines according to the first SOC of the power battery.

In step S203, it is determined whether the first SOC is larger than or equal to n1%, if yes, step S204 is executed; otherwise, step S206 is executed. n1% is a SOC preset value of the power battery 3, which may ensure an output power of the electric compressor.

In step S204, it is determined whether a first predetermined condition for starting the electric compressor is satisfied, if yes, step S205 is executed and step S210 is executed simultaneously; otherwise, step S206 is executed.

In step S205, the electric compressor is started to work.

In some embodiments of the present disclosure, the first state of charge of the power battery is detected first, and when the first state of charge is larger than or equal to the first threshold value, it is further determined whether the first predetermined condition for starting the electric compressor is satisfied. When the first predetermined condition for starting the electric compressor is satisfied, the electric compressor is controlled to start.

In some embodiments, the first predetermined condition includes: (1) an air blower of the air conditioning system is turned on and works in a normal operation state; (2) a line pressure value of the air conditioning system is in a normal range; (3) the power battery is allowed to supply power to the electric compressor; (4) a temperature of an evaporator of the air conditioning system is larger than or equal to a first temperature threshold $t1°$ C.; (5) the mechanical compressor is turned off. The $t1°$ C. is a preset minimum temperature that an evaporation chamber shall reach when the air conditioning system is refrigerating.

In step S206, an engine controller receives a start instruction to start the engine sent from the controller.

In step S207, it is determined whether the engine has started. If yes, step S209 is executed; otherwise, step S208 is executed.

In step S208, the engine is started and it is determined whether a condition for starting the engine is satisfied. If yes, step S209 and step S210 are executed at the same time; otherwise, a failure alarm is generated, for example, an engine failure alarm.

In step S209, it is determined whether a second predetermined condition for starting the mechanical compressor is satisfied. If yes, step S211 is executed; otherwise, a failure alarm is generated, for example, an air conditioning system failure alarm.

As shown in FIG. 2, when the first state of charge is less than the first threshold or the first predetermined condition is dissatisfied, the engine is controlled to start, and it is determined whether the second predetermined condition for starting the mechanical compressor is satisfied, and the mechanical compressor is controlled to start when the second predetermined condition is satisfied. The first predetermined condition is dissatisfied means that the condition that the power battery allows to discharge to the electric compressor is dissatisfied. If one of these conditions: an air blower of the air conditioning system is turned on and works in a normal operation state; a line pressure value of the air conditioning system is in a normal range; a temperature of an evaporator of the air conditioning system is larger than or equal to a first temperature threshold; and the mechanical compressor is turned off is not satisfied, the air conditioning system generates a failure alarm.

In some embodiments, the second predetermined condition includes: (1) an air blower of the air conditioning system is turned on and works in a normal operation state; (2) a line pressure value of the air conditioning system is in a normal range; (3) a temperature of an evaporator of the air conditioning system is larger than or equal to a first temperature threshold; (4) the electric compressor is turned off.

In step S210, a cooling fan of the air conditioning system is controlled to start and step S213 is executed. That is, when the electric compressor or the engine is started, the cooling fan is started.

In step S211, the mechanical compressor is engaged with the engine, i.e., the mechanical compressor is started, and step S212 is executed.

In step S212, the air conditioning system refrigerates.

In some embodiments, after step S211 is executed, the method further includes step S213 to determine a second SOC of the power battery.

In step S213, it is determined whether the second SOC of the power battery is larger than or equal to a second threshold n2%. If yes, steps S204 and S214 are executed; otherwise, then step S211 is executed. n2% is a preset SOC value of the power battery 3, which may ensure the output power of the electric compressor after the hybrid vehicle charged the power battery.

In step S214, the mechanical compressor is controlled to disengage from the engine, that is, the mechanical compressor is turned off.

That is, the second state of charge of the power battery is detected after the mechanical compressor is started. When the second state of charge is larger than or equal to the second threshold n2%, it is determined whether a third predetermined condition for starting the electric compressor is satisfied. When the third predetermined condition is satisfied, the electric compressor is controlled to start, and the mechanical compressor is controlled to turn off, in which the second threshold n2% is larger than the first threshold n1%.

In some embodiments, the third predetermined condition is the same with the first predetermined condition and includes: (1) an air blower of the air conditioning system is turned on and works in a normal operation state; (2) a line pressure value of the air conditioning system is in a normal range; (3) the power battery is allowed to supply power to the electric compressor; (4) a temperature of an evaporator of the air conditioning system is larger than or equal to a first temperature threshold; and (5) the mechanical compressor is turned off.

Generally, the hybrid vehicle charges the power battery when the hybrid vehicle is running. The battery manager detects the second SOC of the power battery, when the second SOC of the power battery is larger than or equal to n2%, the controller 7 controls the mechanical compressor to turn off. And the controller 7 controls the electric compressor to work by determining whether the first predetermined condition for starting the electric compressor is satisfied. In order to avoid a condition that the electric compressor 1 and the mechanical compressor 2 are turned on and off back and forth during the running of the hybrid vehicle, the first threshold n1% is less than the second threshold n2%, and every time when the air conditioning system starts to work, the first state of charge of the power battery 3 is compared with the first threshold n1% first. After the electric compressor 1 is turned off at a first time, the second state of charge of the power battery 3 is compared with the second threshold n2% to determine whether to start the electric compressor 1. Moreover, every time when it is determined whether to turn off the electric compressor 1, the state of charge of the power battery 3 is compared with the first threshold n1%, i.e., once the state of charge of the power battery 3 is less than the first threshold n1%, the electric compressor 1 is turned off. In this way, by setting a SOC range from n1% to n2% of the power battery 3, the condition that the electric compressor 1 and the mechanical compressor 2 are turned on and off back and forth in the running of the hybrid vehicle is avoided, thus improving working lives of the electric compressor 1 and the mechanical compressor 2.

In the embodiment of the present disclosure, as shown in FIG. 2, when the electric compressor is working in step S205, it is still needed to return to step S204 to determine whether the SOC of the power battery is less than the first threshold n1%, if yes, step S206 is executed. That is, a third state of charge of the power battery is detected after the electric compressor is started, and the electric compressor is controlled to turn off and the engine is controlled to start when the third state of charge is less than the first threshold n1%.

And then, it is further determined whether a fourth predetermined condition for starting the mechanical compressor is satisfied; and the mechanical compressor is controlled to start when the fourth predetermined condition is satisfied.

In some embodiments, the fourth predetermined condition is the same with the second predetermined condition and includes: (1) an air blower of the air conditioning system is turned on and works in a normal operation state; (2) a line pressure value of the air conditioning system is in a normal range; (3) a temperature of an evaporator of the air conditioning system is larger than or equal to a first temperature threshold; and (4) the electric compressor is turned off.

In some embodiments, when the hybrid vehicle runs, the battery manager is configured to detect a fourth SOC of the power battery. When the fourth SOC is larger than or equal to a third threshold n3%, the hybrid vehicle enters an electrical mode, and the controller is configured to start the electric compressor, in which the third threshold n3% is larger than the first threshold n1%. When the fourth SOC is less than the third threshold n3% and larger than or equal to the first threshold n1%, the hybrid vehicle enters a hybrid mode, and the engine is started, and the controller is configured to control the electric compressor to start. When the fourth SOC is less than the first threshold n1%, the hybrid vehicle is in the hybrid electrical mode, and the engine is started, and the controller is configured to turn off the electric compressor and to start the mechanical compressor.

In some embodiments, since an operating power of the electric compressor is generally less than a required power for normal run of the hybrid vehicle provided by the driving motor, in order to ensure the operation of hybrid vehicles, a setting value of the second threshold n2% shall not affect a running strategy of a mode switching between the hybrid mode and electrical mode. For example, if a condition of the mode switching condition is determined by the SOC of the power battery, and a SOC threshold thereof is set as the third threshold n3%, it is required that n2%<n3%.

In some embodiments, when the fourth state of charge is larger than or equal to the third threshold n3%, the hybrid vehicle enters the electrical mode, and the controller is configured to start the electric compressor, i.e., the air condition system operates based on the electric compressor and the mechanical compressor is turned off, in which the third threshold n3% is larger than the first threshold n1%. In some embodiments, when the fourth state of charge is less than the third threshold n3% and larger than or equal to the first threshold n1%, the hybrid vehicle enters the hybrid mode, and the engine is started, and the controller is configured to control the electric compressor to start, i.e., the air condition system still operates based on the electric compressor 1 and the mechanical compressor is turned off.

In some embodiments, when the fourth state of charge is less than the first threshold n1%, the hybrid vehicle is in the hybrid electrical mode, and the engine is started, and the controller is configured to turn off the electric compressor and to start the mechanical compressor.

In some embodiments, after the mechanical compressor is started and when the fourth state of charge is less than the third threshold n3% and larger than or equal to the second threshold n2%, the hybrid vehicle is in the hybrid electrical mode, and the engine is started, and the controller is configured to start the electric compressor and to turn off the mechanical compressor. That is, when the SOC of the power battery reaches n2% as charged by the running of the hybrid vehicle, the hybrid vehicle is still in hybrid mode and the engine has started, the controller turns off the mechanical compressor and starts the electric compressor until the SOC of the power battery drops below n1%, and then the controller stops the electric compressor and starts the mechanical compressor.

In an embodiment of the present disclosure, when the fourth state of charge is less than the first threshold and the hybrid electric vehicle enters a compulsory electrical mode, the controller is configured to control the engine controller to start the engine and to start the mechanical compressor. The engine is controlled by a gearbox controller of the hybrid to be independent from driving the hybrid vehicle. If the hybrid vehicle has a compulsory electrical mode (i.e., when the SOC of the power battery is less than the third threshold n3%, the hybrid vehicle is still running in the electrical mode, when the SOC of the power battery is less than the first threshold n1%, in order not to affect a running and power supply mode of the hybrid vehicle with an automatic transmission, when the engine is started, the gearbox controller controls a clutch disengage from a flywheel of the engine, so that the engine does not participate in driving the hybrid vehicle but supplies power to the mechanical compressor in a low speed. Thus, the operation state of the air conditioning system is independent from the running mode of the hybrid vehicle, which avoids a conflict of control strategies.

Thus, in embodiments of the present disclosure, the controller controls the electric compressor to work in accordance with the SOC of the power battery fed back by the battery manager in priority. That is, when an electric quantity of the power battery is sufficient, no matter what the running mode of the hybrid vehicle is, the electric compressor operates in priority, and in an entire refrigeration procedure of the air conditioning system, the mechanical compressor and the electric compressor work independently.

With the method for controlling an air conditioning system according to embodiments of the present disclosure, the electric compressor and the mechanical compressor are controlled to start at different time according to the state of charge of the power battery, which can solve the problem of insufficient voltage. Moreover, the air conditioning system can provide the refrigerant with a high pressure and a high temperature by the electric compressor and the mechanical compressor independent from each other, which provides the passengers a comfortable and energy-saving ride environment, thus fully meeting the needs of users.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An air conditioning system of a hybrid vehicle, comprising:
   an electric compressor;
   a mechanical compressor, connected with the electric compressor in parallel;
   a power battery, connected with the electric compressor and configured to supply power to the electric compressor;
   an engine, connected with the mechanical compressor and configured to supply a power source to the mechanical compressor;
   an engine controller, connected with the engine and configured to start the engine when the mechanical compressor is to be started;
   a battery manager, connected with the power battery and configured to detect a first state of charge of the power battery; and
   a controller, connected with the engine controller and the battery manager and configured to start the electric compressor and the mechanical compressor at different time according to the first state of charge of the power battery,
   wherein a status of the engine is detected based on a result of detecting the first state of charge of the power battery,
   when the first charge state is larger than or equal to a first threshold, the controller is configured to start the electric compressor, and when the first state of charge is less than the first threshold, the controller is configured to start the mechanical compressor,
   after the mechanical compressor is started, the battery manager is configured to detect a second state of charge of the power battery,
   when the second state of charge is larger than or equal to a second threshold, the controller is configured to turn off the mechanical compressor and start the electric compressor, the first threshold is less than the second threshold, and
   every time when the air conditioning system starts to work, the first state of charge of the power battery is compared with the first threshold first, and after the electric compressor is turned off, the second state of charge of the power battery is compared with the second threshold to determine whether to restart the electric compressor.

2. The air conditioning system according to claim 1, wherein
when the first charge state is larger than or equal to the first threshold, the controller is further configured to determine whether a first predetermined condition for starting the electric compressor is satisfied and to start the electric compressor when the first predetermined condition is satisfied.

3. The air conditioning system according to claim 2, wherein the first predetermined condition comprises:
(1) an air blower of the air conditioning system is turned on and works in a normal operation state;
(2) a line pressure value of the air conditioning system is in a normal range;
(3) the power battery is allowed to supply power to the electric compressor;
(4) a temperature of an evaporator of the air conditioning system is larger than or equal to a first temperature threshold; and
(5) the mechanical compressor is turned off.

4. The air conditioning system according to claim 2, wherein
when the first state of charge is less than the first threshold or the first predetermined condition is dissatisfied, the controller is further configured to control the engine controller to start the engine;
the controller is further configured to determine whether a second predetermined condition for starting the mechanical compressor is satisfied; and
the controller is further configured to control the mechanical compressor to start when the second predetermined condition is satisfied.

5. The air conditioning system according to claim 4, wherein the second predetermined condition comprises:
(1) an air blower of the air conditioning system is turned on and works in a normal operation state;
(2) a line pressure value of the air conditioning system is in a normal range;
(3) a temperature of an evaporator of the air conditioning system is larger than or equal to a first temperature threshold; and
(4) the electric compressor is turned off.

6. The air conditioning system according to claim 1, wherein the controller is further configured to control a cooling fan of the air conditioning system to start, when the electric compressor or the engine is started.

7. The air conditioning system according to claim 4, wherein
when the second state of charge is larger than or equal to the second threshold, the controller is further configured to determine whether a third predetermined condition for starting the electric compressor is satisfied; and
when the third predetermined condition is satisfied, the controller is further configured to start the electric compressor.

8. The air conditioning system according to claim 7, wherein the third predetermined condition comprises:
(1) an air blower of the air conditioning system is turned on and works in a normal operation state;
(2) a line pressure value of the air conditioning system is in a normal range;
(3) the power battery is allowed to supply power to the electric compressor;
(4) a temperature of an evaporator of the air conditioning system is larger than or equal to a first temperature threshold; and
(5) the mechanical compressor is turned off.

9. The air conditioning system according to claim 2, wherein
after the electric compressor is started, the battery manager is configured to detect a third state of charge of the power battery; and
when the third state of charge is less than the first threshold, the controller is configured to turned off the electric compressor.

10. The air conditioning system according to claim 9, wherein the controller is further configured to control the engine controller to start the engine, to determine whether a fourth predetermined condition for starting the mechanical compressor is satisfied, and to start the mechanical compressor when the fourth predetermined condition is satisfied.

11. The air conditioning system according to claim 10, wherein the fourth predetermined condition comprises:
(1) an air blower of the air conditioning system is turned on and works in a normal operation state;
(2) a line pressure value of the air conditioning system is in a normal range;
(3) a temperature of an evaporator of the air conditioning system is larger than or equal to a first temperature threshold; and
(4) the electric compressor is turned off.

12. The air conditioning system according to claim 2, wherein
when the hybrid vehicle runs, the battery manager is configured to detect a fourth state of charge of the power battery; and
when the fourth state of charge is larger than or equal to a third threshold, the hybrid vehicle enters an electrical mode, and the controller is configured to start the electric compressor, wherein the third threshold is larger than the first threshold.

13. The air conditioning system according to claim 12, wherein
when the fourth state of charge is less than the third threshold and larger than or equal to the first threshold, the hybrid vehicle enters a hybrid mode, and the engine is started, and the controller is configured to control the electric compressor to start.

14. A hybrid vehicle, comprising an air conditioning system according to claim 1.

15. A method for controlling an air conditioning system of a hybrid vehicle, wherein the air conditioning system comprises: an electric compressor, a mechanical compressor connected with the electric compressor in parallel, a power battery and an engine, the method comprising:
detecting a first state of charge of the power battery;
when the first state of charge is less than a first threshold, determining whether the engine has started, and starting the mechanical compressor; and
when the first state of charge is larger than the first threshold, starting the electric compressor; wherein the electric compressor and the mechanical compressor are started at different time according to at least the first state of charge of the power battery,
after the mechanical compressor is started, detecting a second state of charge of the power battery,
when the second state of charge is larger than or equal to a second threshold, turning off the mechanical compressor and starting the electric compressor, wherein the first threshold is less than the second threshold, and every time when the air conditioning system starts to work, the first state of charge of the power battery is compared with the first threshold first, and after the electric compressor is turned off, the second state of charge of the power battery is compared with the second threshold to determine whether to restart the electric compressor.

16. The method according to claim 15, after detecting the first state of charge of the power battery, further comprising:
   determining whether a first predetermined condition for starting the electric compressor is satisfied when the first state of charge is larger than or equal to the first threshold; and
   starting the electric compressor when the first predetermined condition is satisfied.

17. The method according to claim 16, wherein the first predetermined condition comprises:
   (1) an air blower of the air conditioning system is turned on and works in a normal operation state;
   (2) a line pressure value of the air conditioning system is in a normal range;
   (3) the power battery is allowed to supply power to the electric compressor;
   (4) a temperature of an evaporator of the air conditioning system is larger than or equal to a first temperature threshold; and
   (5) the mechanical compressor is turned off.

18. The method according to claim 15, further comprising:
   controlling the engine controller to start the engine when the first state of charge is less than the first threshold or the electric compressor dissatisfies the first predetermined condition;
   determining whether a second predetermined condition for starting the mechanical compressor is satisfied; and
   starting the mechanical compressor when the second predetermined condition is satisfied.

19. The method according to claim 18, wherein the second predetermined condition comprises:
   (1) an air blower of the air conditioning system is turned on and works in a normal operation state;
   (2) a line pressure value of the air conditioning system is in a normal range;
   (3) the temperature of an evaporator of the air conditioning system is larger than or equal to a first temperature threshold; and
   (4) the electric compressor is turned off.

20. The method according to claim 15, further comprising:
   controlling a cooling fan of the air conditioning system to start when the electric compressor or the engine is started.

* * * * *